United States Patent [19]
Fukuda et al.

[11] Patent Number: 4,780,796
[45] Date of Patent: Oct. 25, 1988

[54] SOLID ELECTROLYTIC CAPACITOR

[75] Inventors: Minoru Fukuda, Maebashi; Hideo Yamamoto, Shibukawa; Isao Isa, Misatomachi, all of Japan

[73] Assignee: The Japan Carlit Co., Ltd., Tokyo, Japan

[21] Appl. No.: 138,591

[22] Filed: Dec. 28, 1987

[30] Foreign Application Priority Data

Jan. 13, 1987 [JP] Japan ................................. 61-4053
Feb. 12, 1987 [JP] Japan ................................ 61-28197

[51] Int. Cl.⁴ ............................................. H01G 9/00
[52] U.S. Cl. ................................... 361/433; 29/570.1
[58] Field of Search ................... 29/570.1; 361/433; 437/1; 429/212, 213

[56] References Cited

U.S. PATENT DOCUMENTS

| | | | |
|---|---|---|---|
| 3,884,777 | 5/1975 | Harke et al. | 204/84 |
| 3,955,126 | 5/1976 | Murakami et al. | 361/433 |
| 4,001,655 | 1/1977 | Voyles et al. | 361/433 |
| 4,609,971 | 9/1986 | Shaffer | 361/433 |
| 4,717,673 | 1/1988 | Wrighton et al. | 436/68 |
| 4,728,589 | 3/1988 | MacDiarmid et al. | 429/213 |

FOREIGN PATENT DOCUMENTS

| | | |
|---|---|---|
| 58-17609 | 2/1983 | Japan . |
| 58-191414 | 11/1983 | Japan . |
| 60-244017 | 12/1985 | Japan . |
| 61-2315 | 1/1986 | Japan . |

Primary Examiner—Donald A. Griffin
Attorney, Agent, or Firm—Frishauf, Holtz, Goodman & Woodward

[57] ABSTRACT

A solid electrolytic capacitor having excellent characteristics in terms of both electrical properties and thermal stability is obtained by employing a solid electrolyte comprising both an electrically conductive polymer layer (I) formed by a chemical oxidation method and an electrically conductive polymer layer (II) formed by an electrochemical oxidation method.

5 Claims, 1 Drawing Sheet

SOLID ELECTROLYTIC CAPACITOR

BACKGROUND OF THE INVENTION

1. Field of the Invention

The present invention relates to a solid electrolytic capacitor that utilizes an electrically conductive polymer as a solid electrolyte.

2. Description of the Related Art

The development of digital devices in recent years has given rise to a demand for large-capacity capacitors which have excellent high-frequency characteristics; and studies have been made directed to the application of an electrically conductive polymer in this field.

Examples of known capacitors which have excellent high-frequency characteristics include thin-film, mica and ceramic capacitors. These conventional capacitors, however, involve the problem that, when they are designed to obtain an electrostatic capacity of 1 $\mu$F or more, their size is increased, and the production cost is also raised considerably.

Electrolytic capacitors which are known to be large-capacity capacitors include two types, that is, the liquid electrolyte type in which a liquid electrolyte is impregnated, and the solid electrolyte type in which manganese dioxide is employed as a solid electrolyte. The former type of electrolytic capacitor which employs an electrolyte in a liquid state utilizes ion conduction, and there is therefore a remarkably increased resistance in the high-frequency region, whereby the impedance of the capacitor increases disadvantageously. The latter type of electrolytic capacitor employs as a solid electrolyte manganese dioxide and a charge transfer complex consisting of a combination of 7,7,8,8-tetracyanoquinodimethane (hereinafter referred to as TCNQ) and an electron donor.

The type of electrolytic capacitor which employs manganese dioxide as a solid electrolyte is obtained by thermally decomposing manganese nitrate since manganese dioxide is an insoluble solid substance. This type of electrolytic capacitor also has relatively high impedance in the high-frequency region, partly because manganese dioxide has a relatively high specific resistance, and partly because it is subjected to thermal decomposition several times to obtain manganese dioxide. Also a dielectric oxide coating provided on this type of electrolytic capacitor may be readily damaged, and the loss current of the capacitor thus increases to a remarkable extent.

The type of electrolytic capacitor which employs as a solid electrolyte a charge transfer complex consisting of a combination of TCNQ and an electron donor has already been proposed (see Japanese patent public disclosure No. 191414/1983, No. 17609/1983). However, this TCNQ charge transfer complex which has high electrical conductivity suffers from thermal stability and therefor involves a risk of the complex being decomposed during the capacitor manufacturing process to become an insulator.

A type of electrolytic capacitor which employs as a solid electrolyte a hetrocyclic polymer obtained by a electrochemical polymerization method has been proposed in recent years (see Japanese patent public disclosure No. 244017/1985, No. 2315/1986).

The electrolytic capacitor described above comprises an electrode having a dielectric oxide coating thereon and a solid electrolyte consisting of an electrically conductive hetrocyclic polymer which is formed by an electrochemical oxidation method. However, forming the electrically conductive hetrocyclic polymer on the dielectric oxide coating is impossible or, at least, difficult because the dielectric oxide coating is an insulator.

SUMMARY OF THE INVENTION

Usually, an electrically conductive polymer is formed by a chemical oxidation method or an electrochemical oxidation method. The polymer which is obtained by the former method has poor mechanical strength. No polymer is formed on the dielectric oxide coating using the latter method because the dielectric oxide coating is an insulator.

It is a first object of the present invention to provide an electrolytic capacitor by employing an electrically conductive polymer as a solid electrolyte for the capacitor.

It is a second object of the present invention to provide an electrolytic capacitor which is excellent in both electrical characteristics and thermal stability superior to that of the conventional capacitors.

Other objects and advantages of the present invention will become apparent to those skilled in the art from the following description and disclosure.

DETAILED DESCRIPTION OF THE PREFERRED EMBODIMENTS

Figure 1:
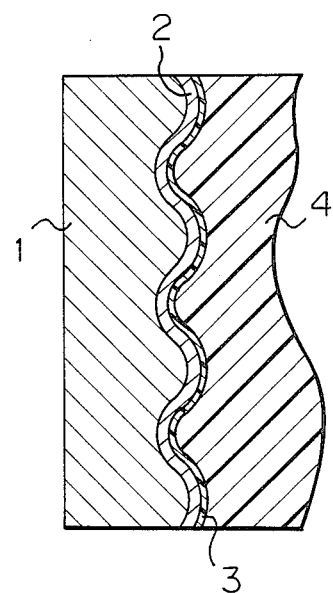
FIG. 1 is a schematic, partial, sectional view illustrating the construction of a solid electrolytic capacitor according to one embodiment of the present invention.

The present inventors made exhaustive studies with a view to attaining the above objects and have found that the above-described disadvantages of the prior art can be overcome by providing a solid electrolytic capacitor comprising, in combination, an electrode having an adherent dielectric oxide coating thereon and a solid electrolyte comprising both an electrically conductive polymer layer (I) which is formed by a chemical oxidation method, contacting a monomer with an oxidizing agent, and an electrically conductive polymer layer (II) which is formed by electrochemical oxidation method.

The invention will be better understood from the following description taken in conjunctionl with the accompanying drawing, FIG. 1, which partially shows the construction of an electrical capacitor which embodies the present invention.

The surface of an electrode 1 which is roughened by an electrochemical treatment is oxidized by an electrochemical oxidation treatment or an air oxidation treatment whereby a dielectric oxide coating 2 is formed on the electrode.

A solution containing an oxidizing agent in a concentration of 0.001 mol/l to 2 mol/l is dispersed uniformly on the dielectric oxide coating by dipping, coating or spraying and the oxidizing agent is then brought into contact with a monomer of an electrically conductive polymer (I) or a solution of the monomer in a concentration of more than 0.01 mol/l. Consequently, an electrically conductive polymer layer 3 which is obtained by a chemical oxidation method is formed on the dielectric oxide coating 2. The electrically conductive polymer layer 3 is able to be formed by an inverse procedure in which the monomer is brought into contact with the oxidizing agent.

The electrically conductive polymer layer 3 is used as an anode for electro polymerization. An electrically conductive polymer layer 4 which is obtained by an electrochemical oxidation method is formed in a cell containing a solution of a monomer of an electrically conductive polymer (II) in a concentration of 0.01 mol/l to 5 mol/l and an electrolyte salt in a concentration of 0.01 mol/l to 2 mol/l. Consequently, the electrically conductive polymer layer 4 is formed on the electrically conductive polymer layer 3.

A counter electrode is brought into contact with the electrically conductive polymer layer 4 using an electrically conductive adhesive (silver paste etc.) The capacitor of the present invention is completed by the procedure described above and is then molded with epoxy resin.

The electrode used in the capacitor of this invention is generally selected from either aluminum or tantalum.

Commonly used oxidizing agents include a halogen such as iodine, bromine and bromine iodide; a halide such as antimony pentafluoride, arsenic pentafluoride, silicon tetrafluoride, phosphorus pentachloride, phosphorus pentafluoride, feric-chloride, aluminum chloride and molybdenum chloride; a protonic acid such as sulfuric acid, nitric acid, fluorosulfuric acid, trifluoromethane sulfuric acid and chlorosulfuric acid; a compound containing oxygen such as sulfur trioxide, nitrogen dioxide and chlorine dioxide; a persulfate such as sodium persulfate, potassium persulfate and ammonium persulfate; and a peroxide such as hydrogen peroxide, peracetic acid and difluorosulfunil peroxide.

The preferred compounds of said oxidizing agent are chlorine dioxide and ammonium persulfate.

Said electrically conductive polymer layer (I) which is formed by a chemical oxidation method is generally selected from the group consisting of polypyrrole, polythiophene, polyaniline and polyfuran. The preferred polymer of said electrically conductive polymer layer (I) is polypyrrole or polyaniline.

Said electrolyte salt consists of an anion and a cation. Commonly used anions include an halogenated anion such as hexafluorophosphate, hexafluoroarsenate, tetrafluoroborate and perchlorate; a halide such as chloride, bromide and iodide; and a sulfonate such as alkylbenzenesulfonate, aminobenzenesulfonate, benzenesulfonate and $\beta$-naphthalenesulfonate. The most preferred anion is sulfonate.

Commonly used cations include an alkali metal cation such as lithium, sodium and potassium; and an ammonium cation such as ammonium and tetraalkilammonium.

Suitable electrolyte salts include lithium hexafluorophosphate, lithium hexafluoroarsenate, lithium perchlorate, sodium iodide, sodium hexafluorophosphate, sodium perchlorate, potassium iodide, potassium hexafluorophosphate, potassium hexafluoroarsenate, potassium perchlorate, lithium tetrafluoroborate and tetrabutylammonium toluenesulfonate.

Said electrically conductive polymer layer (II) which is formed by an electrochemical oxidation method is generally selected from the group consisting of polypyrrole, polythiophene, polyaniline and polyfuran. The most preferred electrically conductive polymer layer (II) is polypyrrole or polyaniline.

It is known that an electric capacitor having a TCNQ charge transfer complex as an electrolyte has excellent high-frequency characteristics. However, the TCNQ charge transfer complex suffers from thermal stability and therefore involves a risk of the complex being decomposed during the capacitor manufacturing process to become an insulator. Furthermore, forming an electrically conductive hetrocyclic polymer having excellent mechanical strength by an electrochemical oxidation method on an electrode having a dielectric oxide coating is impossible, because the dielectric oxide coating is an insulator.

The above-described disadvantages can be overcome by the solid electrolytic capacitor of the present invention. This solid electrolytic capacitor having an organic semiconductor as a solid electrolyte is excellent in both electrical characteristics and thermal stability.

The present invention will be explained more specifically below by way of Examples, though it is in no way restricted to these Examples.

EXAMPLE 1

An aluminium anode foil (thickness: 60 $\mu$m) having a dielectric aluminium oxide coating formed thereon by an electrochemical oxidation treatment was dipped in an aqueous solution containing 0.04 mol/l ammonium persulfate under reduced pressure conditions for 10 minutes and then dried.

The anode foil was dipped in acetonitrile containing 2.0 mol/l pyrrole monomer under reduced pressure conditions for 10 minutes. A thin layer of polypyrrole was formed on the dielectric aluminium oxide coating by a chemical oxidation method.

Subsequently, the anode foil was dipped in an aqueous solution containing 0.2 mol/l pyrrole monomer, 0.02 mol/l oxalic acid and 0.05 mol/l tetrabutylammonium toluene-sulfonate as an electrolyte. The anode foil was used as an anode and a stainless steel plate was used as a cathode. A uniform black layer of polypyrrole was formed galvanostatically on the anode foil under a current density of 0.5 mA/cm$^2$ applied for 150 minutes. After a counter electrode had been brought into contact with the black layer of polypyrrole using a silver paste, a capacitor was obtained and then molded with epoxy resin.

The characteristics of the obtained capacitor are shown in Table 1.

EXAMPLE 2

Ethyl ether containing 0.1 mol/l iodine was sprayed on an aluminium anode foil (thickness: 60 $\mu$m) having a dielectric aluminium oxide coating formed thereon by an electrochemical oxidation treatment and the anode foil was then dried.

After dipping the anode foil in pyrrole monomer for 30 minutes under reduced pressure conditions, a black layer of polypyrrole was formed on the dielectric aluminium oxide coating by a chemical oxidation method. The following procedures were carried out in a similar manner to Example 1.

The characteristics of the obtained capacitor are shown in Table 1.

EXAMPLE 3

An aluminium anode foil (thickness: 60 $\mu$m) having a dielectric aluminium oxide coating thereon was dipped in an aqueous solution containing 0.02 mol/l feric chloride for 2 minutes under reduced pressure conditions and then dried.

After dipping the anode foil for 30 minutes in an aqueous solution containing 0.1 mol/l pyrrole monomer, a black layer of polypyrrole was formed on the dielectric aluminium oxide coating by a chemical oxidation method. The following procedures were carried out in a similar manner to Example 1.

The characteristics of the obtained capacitor are shown in Table 1.

EXAMPLE 4

An aluminium anode foil (thickness: 60 μm) having a dielectric aluminium oxide coating formed thereon by an electrochemical oxidation method was dipped in pyrrole monomer. When a gaseous mixture containing 5 vol% chlorine dioxide was brought into contact with the anode foil for 5 minutes, a black layer of polypyrrole was formed on the dielectric aluminium oxide coating by a chemical oxidation method. The following procedures were carried out in a similar manner to Example 1.

The characteristics of the obtained capacitor are shown in Table 1.

COMPARATIVE EXAMPLE 1

An electrochemical oxidation treatment was carried out similar to Example 1 except that a layer of polypyrrole was formed on a dielectric aluminium oxide coating by a chemical oxidation method. Polypyrrole was formed on only a part of the dielectric aluminium oxide coatingl and no uniform layer of polypyrrole was formed.

EXAMPLE 5

An aluminium anode foil (thickness: 60 μm) having a dielectric aluminium oxide coating formed thereon by an electrochemical oxidation treatment was dipped in aniline monomer.

After a gaseous mixture containing 5 vol% chlorine dioxide had been brought into contact with the anode foil for 10 minutes, a layer of polyaniline was formed on the dielectric aluminium oxide coating by a chemical oxidation method.

Subsequently, the anode foil was dipped in an aqueous solution containing 1.0 mol/l aniline monomer and 1.0 mol/l sulfuric acid as an electrolyte. The anode foil was used as an anode and a platinum plate as a cathode. A uniform dark green layer of polyaniline was formed on the anode foil galvanostatically under a current density of 0.5 mA/cm$^2$ applied for 150 minutes. After a counter electrode was brought into contact with the dark green layer of polyaniline using a silver paste, a capacitor was obtained and then molded with epoxy resin.

The characteristics of the obtained capacitor are shown in Table 1.

EXAMPLE 6

A sintered tantalum anode pellet having a dielectric tantalum oxide coating formed thereon by an electrochemical oxidation treatment was dipped in an aqueous solution containing 0.04 mol/l ammonium persulfate under reduced pressure conditions for 5 minutes and then dried.

The anode pellet was dipped in an aqueous solution containing 2.0 mol/l pyrrole monomer and 0.02 mol/l adipic acid under reduced pressure conditions for 10 minutes. A thin layer of polypyrrole was formed on the dielectric tantalum oxide by a chemical oxidationl method.

Subsequently, the anode pellet was dipped in an aqueous solution containing 0.2 mol/l pyrrole monomer, 0.02 mol/l oxalic acid and 0.05 mol/l lithium perchlorate as an electrolyte.

The anode pellet was used as an anode and a stainless steel plate as a cathode. A uniform black layer of polypyrrole was formed galvanostatically on the anode pellet under a current density of 0.5 mA/cm$^2$ applied for 150 minutes. After a counter electrode had been brought into contact with the black layer of polypyrrole using silver paste, a capacitor was obtained and then molded with epoxy resin.

The characteristics of the obtained capacitor are shown in Table 1.

EXAMPLE 7

A sintered tantalum anode pellet having a dielectric tantalum oxide coating formed thereon by an electrochemical oxidation treatment was dipped in pyrrole monomer.

After bringing a gaseous mixture containing 5 vol% chlorine dioxide into contact with the anode pellet for 5 minutes, a black layer of polypyrrole was formed on the dielectric tantalum oxide by a chemical oxidation method.

The following procedures were carried out in a similar manner to Example 6.

The characteristics of the obtained capacitor are shown in Table 1.

TABLE 1

| Ex. | Anode | Solid Electrolyte | Electrical Characteristics | |
|---|---|---|---|---|
| | | | Cap (μF/cm$^2$) | tan δ (%) |
| 1 | aluminium | polypyrrole | 2.2 | 1.5 |
| 2 | aluminium | polypyrrole | 2.0 | 1.3 |
| 3 | aluminium | polypyrrole | 2.1 | 1.8 |
| 4 | aluminium | polypyrrole | 2.2 | 1.3 |
| 5 | aluminium | polyaniline | 2.0 | 1.2 |
| 6 | tantalum | polypyrrole | 1.2 | 1.0 |
| 7 | tantalum | polypyrrole | 1.2 | 0.9 |

In Table 1, Cap means electrostatic capacity at 120 Hz, tan δ means dielectric loss tangent at 120 Hz. Electrostatic capacity of the aluminium anode foil and the tantalum pellet used in Example show 2.0 μF/cm$^2$ and 1.0 μF, respectively, when an aqueous solution containing 50 g/l boric acid, 50 g/l citric acid and 50 ml/l ammonia water (28 wt%) is employed as liquid electrolyte.

What is claimed is:

1. A solid electrolytic capacitor having excellent characteristics in terms of both electrical properties and thermal stability comprising, in combination, an electrode having an adherent dielectric oxide coating thereon and a solid electrolyte comprising an electrically conductive polymer layer (I) formed by a chemical oxidation method comprising contacting a monomer with an oxidizing agent and an electrically conductive polymer layer (II) formed on the electrically conductive polymer layer (I) by an electrochemical oxidation method.

2. The solid electrolytic capacitor according to claim 1, wherein said electrode is made of aluminum or tantalum.

3. The solid electrolytic capacitor according to claim 1, wherein said electrically conductive polymer layer (I) is polypyrrole or polyaniline.

4. The solid electrolytic capacitor according to claim 1, wherein said oxidizing agent is chlorine dioxide.

5. The solid electrolytic capacitor according to claim 1, wherein said electrically conductive polymer layer (II) is polypyrrole or polyaniline.

* * * * *

UNITED STATES PATENT AND TRADEMARK OFFICE
CERTIFICATE OF CORRECTION

PATENT NO. : 4,780,796

DATED : October 25, 1988

INVENTOR(S) : FUKUDA et al

It is certified that error appears in the above-identified patent and that said Letters Patent is hereby corrected as shown below:

Title Page, [30] Foreign Application Priority Data:

Replace "61-4053" with --62-4053--

Replace "61-28197" with --62-28197--.

Signed and Sealed this

Fourteenth Day of September, 1993

Attest:

BRUCE LEHMAN

*Attesting Officer*     *Commissioner of Patents and Trademarks*